United States Patent [19]

Keno

[11] Patent Number: 5,678,354
[45] Date of Patent: Oct. 21, 1997

[54] NO-BURN PROCESS FOR FOSTERING GROWTH OF A MATURE PERENNIAL GRASS CROP IN A FIELD

[76] Inventor: Charles M. Keno, 21002 E. Bradshaw Rd., Fairfield, Wash. 99012

[21] Appl. No.: 582,705

[22] Filed: Jan. 4, 1996

[51] Int. Cl.$^6$ ............ A01D 45/30; A01G 1/00; A01G 1/12
[52] U.S. Cl. .............. 47/58; 19/6; 56/16.5
[58] Field of Search ............ 47/58; 19/6; 56/13.5, 56/16.5

[56] References Cited

U.S. PATENT DOCUMENTS

| 4,078,626 | 3/1978 | Weichel | 180/53 |
|---|---|---|---|
| 4,109,448 | 8/1978 | Kline | 56/13.5 |
| 4,287,708 | 9/1981 | Neely, Jr. | 56/13.5 |
| 4,525,988 | 7/1985 | Harlan | 56/16.8 |
| 4,702,423 | 10/1987 | Cerveira de Mello Ribeiro Pinto | 241/60 |

OTHER PUBLICATIONS

Burton et al. Reduction of Greenbug (*Homoptera: Aphididae*) Populations by Surface Residues in Wheat Tillage Studies. Journal of Economic Entomology. vol. 78. pp. 390–394, 1985.

Chilcote et al. Grass Seed Production in the Absence of Open–field Burning. Journal of Applied Seed Production. vol. 9. pp. 33–37, 1991.

Mueller–Warrant et al. Influence of Residue Removal Method and Herbicides on Perennial Ryegrass Seed Production: I. Weed Control. Agronomy Journal. vol. 86. pp. 677–684, 1994.

*Primary Examiner*—David T. Fox
*Assistant Examiner*—Melissa L. Kimball
*Attorney, Agent, or Firm*—Wells, St. John, Roberts, Gregory & Matkin P.S.

[57] ABSTRACT

A no-burn process for fostering growth of a mature perennial grass crop in a field. The process includes: (a) providing seed-containing heads on the grass crop; (b) removing seed from the seed-containing heads to leave a standing remnant of the grass crop in the field, the standing remnant having a top surface which is elevated above the ground; (c) leaving the standing remnant unburned; (d) applying a layer of nitrogen beneath the top surface of the unburned standing remnant within about three months of removing the seed from the seed-containing heads; and (e) depositing a substantially uniform layer of light reflecting material beneath the top surface of the unburned standing remnant throughout the field within about three months of removing the seed from the seed-containing heads.

8 Claims, 5 Drawing Sheets

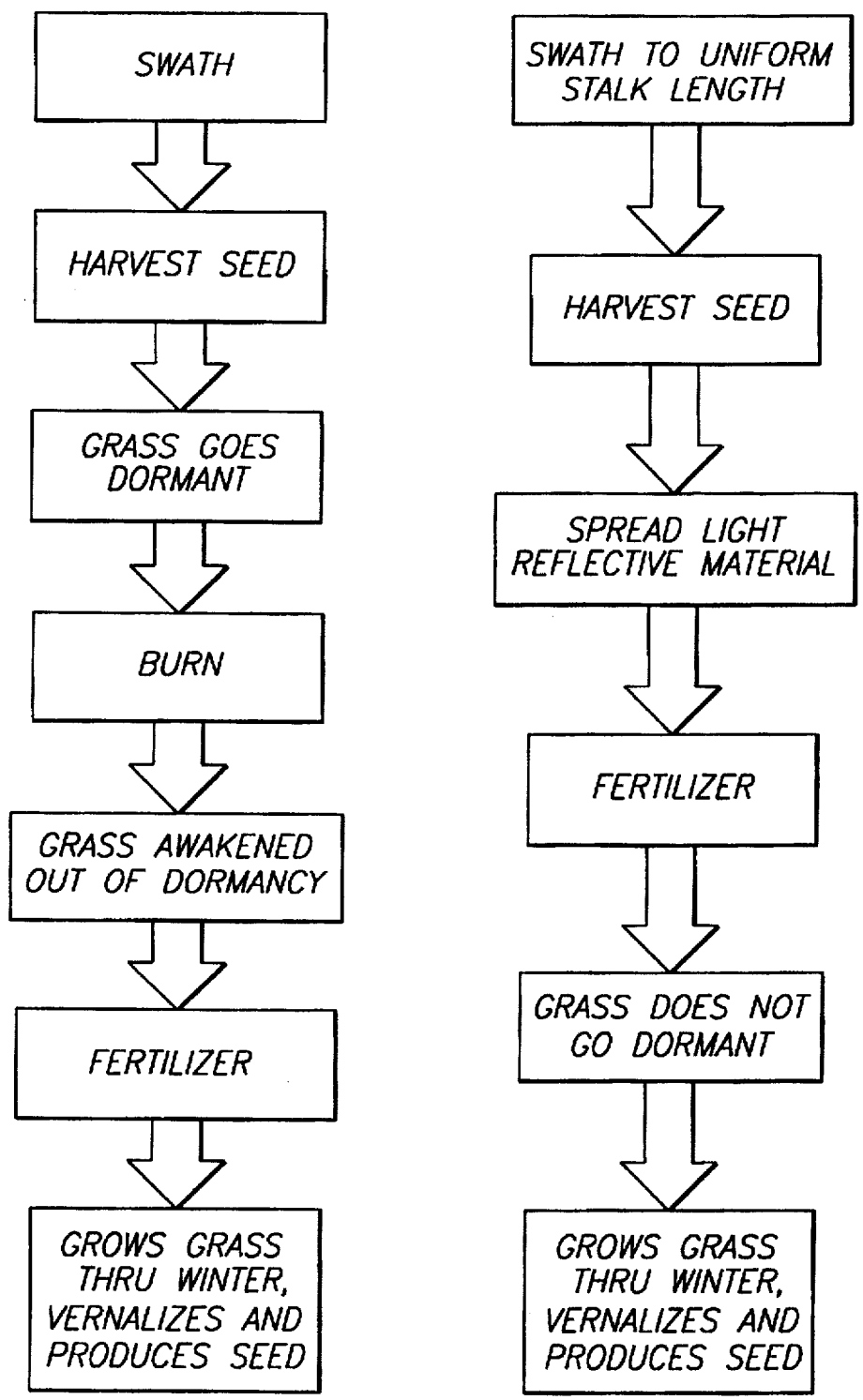

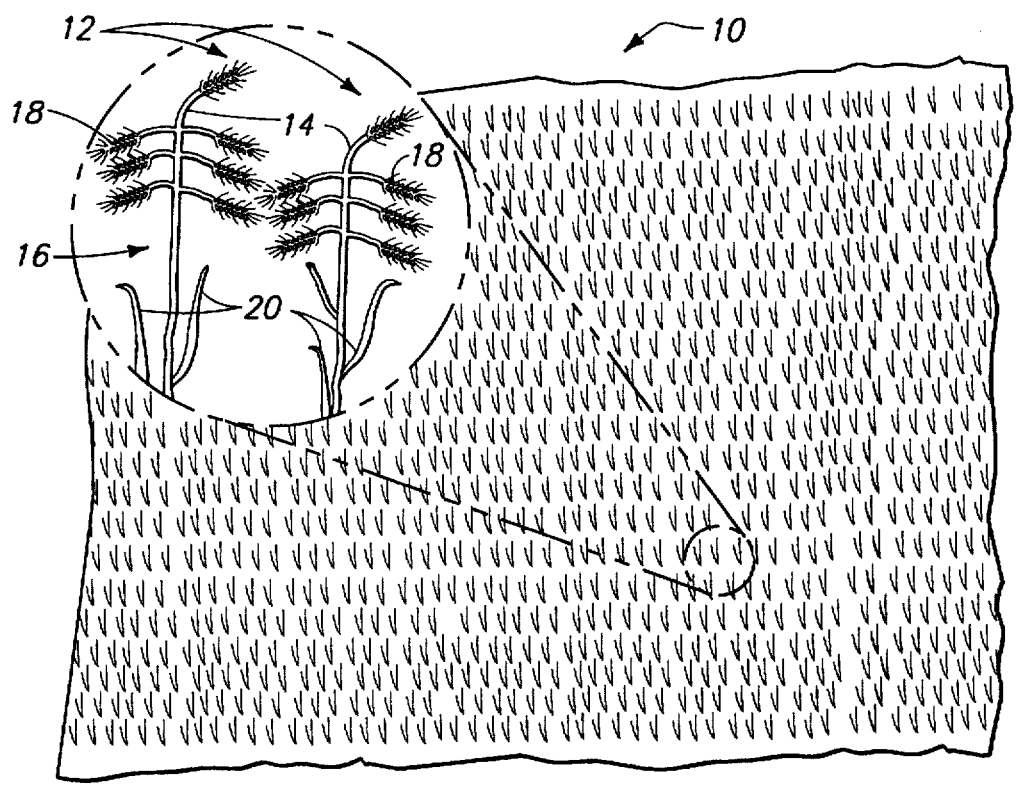
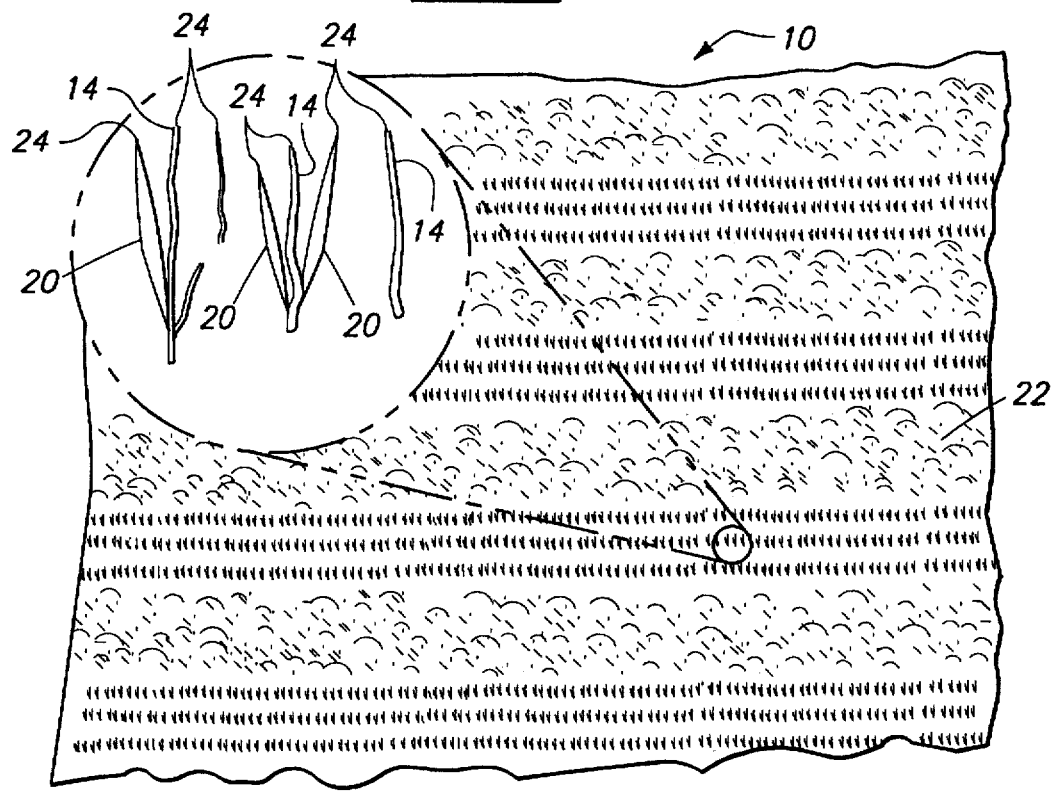

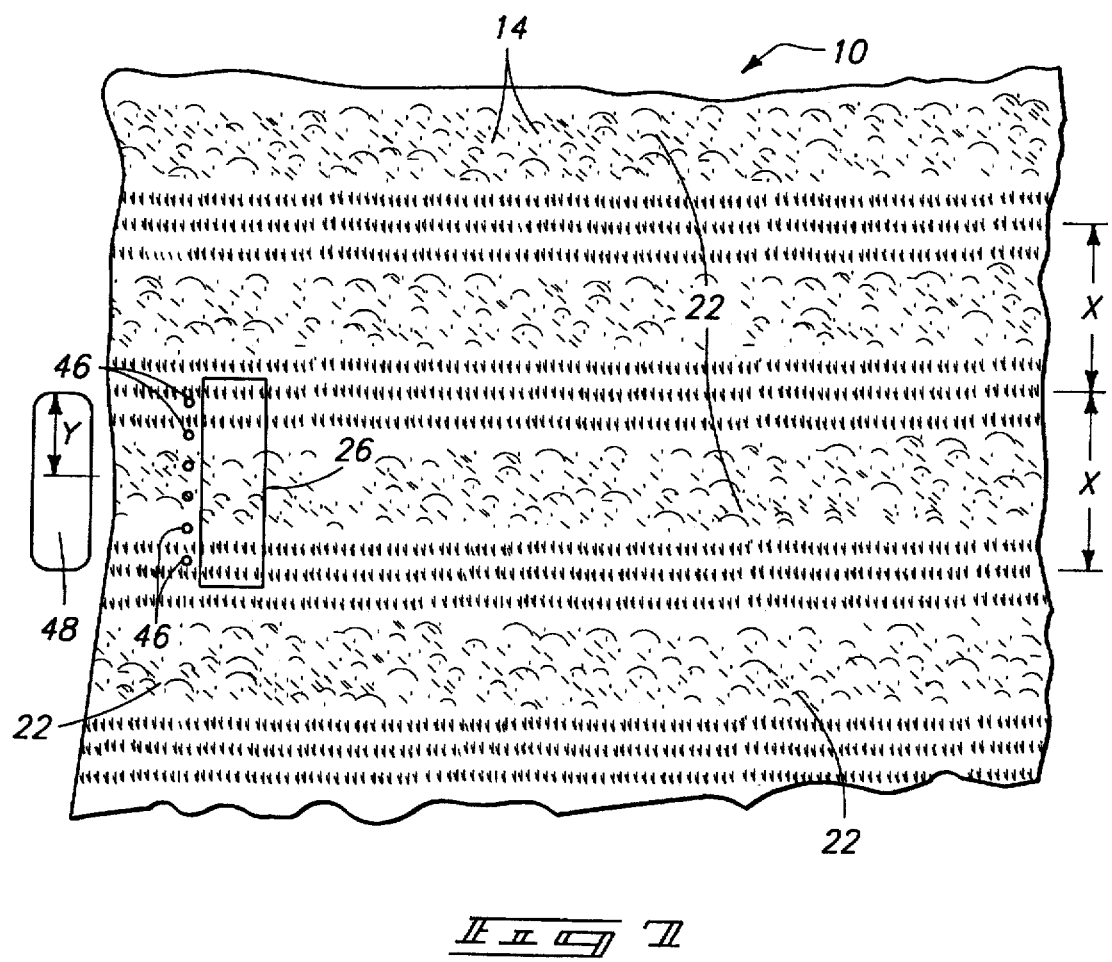

NO-BURN PROCESS FOR FOSTERING GROWTH OF A MATURE PERENNIAL GRASS CROP IN A FIELD

TECHNICAL FIELD

This invention relates to a no-burn process for fostering growth in perennial grass crops without field burning.

BACKGROUND OF THE INVENTION

Among the varieties of grass that are farmed are perennial varieties including rescues, bluegrass, and ryegrass. Such perennial varieties are generally raised in fields that are kept in production for several continuous years. Fields are seeded one year before their first harvest. After the first harvest, the field is referred to as an established field, and will usually decline in seed production after its third crop seed year. Fields which have been in seed production four years or longer are referred to as "old fields." A stand of grass can be used for commercial seed production for many years. A typical stand of bluegrass, for example, will be used for commercial seed production for about eight years, and some bluegrass fields have been known to produce seed for fifteen years.

Referring to FIG. 1 of the accompanying drawings, a conventional process for harvesting grass from a mature field is shown to include several steps. The first step is to swath the standing grass. The grass is preferably swathed while it is still somewhat green so that seed-containing heads (18 in FIG. 3) do not shatter during the swathing process. The swathing process separates upper stems (16 in FIG. 3) and seed-containing heads (18 in FIG. 3) from grass plants (12 in FIG. 3) comprising stalks (14 in FIG. 3) and lower leaves (20 in FIG. 3). Before swathing, the grass generally stands at a height of from about 28 inches to about 42 inches tall to the top of the seed head. In conventional "burn" type grass farming, grass stalks are generally swathed so that the length of the remaining stalks or stubble is from about 1 inch to about 12 inches. The cutting height is more or less randomly selected, in part according to ground conditions and terrain. In this conventional process, no consideration has been given to stalk length and its effect on light reflectivity in the harvested field.

The next step in conventional prior art grass farming processes is to harvest seed from the swathed grass. The swathed upper stems and seed-containing heads are formed into windrows and dried in the sun until they become brittle enough to be readily broken by a harvesting implement, such as a combine or some other mobile thrashing and separating implement. After the seed-containing heads are dried, the windrows are lifted into the mobile thrashing and separating implement which separates the dried upper stems and seed-containing heads into grass seed, chaff and stem residues. The grass seed is collected while the chaff and stem residue are disposed back onto the field. The disposed chaff and stem residue may either be left in the field to be burned along with the stubble or it may be baled and collected.

After the seed is collected and removed, the grass plant stubble and leaves remaining in the field are allowed to dry in the sun, causing the grass plants to go dormant. After dormancy is established, the field is burned to shock the plants back from dormancy. Fertilizer is then applied to encourage growth to a point where the plants will not likely be affected by winter weather.

The fertilization occurs subsequent to the burn so that the nutrient value of the fertilizer is not impaired through oxidation caused by the burn. The applied fertilizer preferably comprises a significant amount of nitrogen to replenish nitrogen that is removed from the field through the harvest of the nitrogen rich seed.

It is preferred that the grass come out of dormancy in the late summer or early fall. This ensures that the grass will grow to a stage which can "vernalize" (become reproductive after a cold period). Grass which has not adequately matured beyond juvenility by mid-winter may not vernalize and flower at late springtime.

From the above discussion it should be clear that field burning has played an important role in the conventional methods of grass field farming. Burning has been thought necessary to ensure that plants will snap out of drought induced dormancy and mature to a stage which can fully survive the winter months and vernalize. The burn also sterilizes a grass field to decrease diseases and pests.

Unfortunately, field burning carries with it several negative aspects. For instance, field burning often contributes to a significant amount of air pollution in otherwise pristine areas during the late summer months when field burning is prevalent. With growing population crowding the edges of farm country, ever increasing pressure is being exerted to discourage "burn" type grass farming. This is clearly evidenced by ever increasing civil litigation with claimants seeking compensatory damages for alleged injuries arising from suspended particulates produced by burning.

Also, field burning adds to the expenses that grass farmers must shoulder. To adequately burn a field the farmer often needs to buy or rent relatively expensive, specialized burning equipment. The farmer must also invest time and effort into providing safeguards around his grass fields so that fires will not spread out of control. Further, the farmer must expend time and effort in obtaining the proper permits so that he may burn his grass fields in accordance with ever increasing restraints in government regulations.

For the above-mentioned reasons, it is desirable to develop a method of grass seed production that does not require field burning.

One method that has been used with some degree of success in various parts of the country to grow grass seed without field burning is to use the conventional method of grass seed farming and simply delete the field burning step. In such a method, grass seed is harvested from mature grass, and seed, chaff and straw residue are removed from the field. Fertilizer is then applied to the remaining grass plants to initiate their growth for the next season. Among the problems associated with such methods is that the grass often does not grow rapidly enough to vernalize. Accordingly, a need remains for a no-burn system which encourages rapid growth of grass plants following the grass seed harvest.

SUMMARY OF THE INVENTION

The invention disclosed herein is a no-burn process for fostering growth of a mature perennial grass crop in a field. The process includes removing seed from the seed-containing heads of a grass crop while leaving an elevated standing remnant of the grass crop in the field, leaving said standing remnant unburned, applying nitrogen fertilizer beneath the top surface of the remnant, and producing a light reflective surface by depositing a substantially uniform layer comprised of the residue of the threshed seed-containing heads and stalks beneath the top surface of the standing remnant.

BRIEF DESCRIPTION OF THE DRAWINGS

Preferred embodiments of the invention are described below with reference to the accompanying drawings, which are briefly described below.

FIG. 1 is a block diagram illustrating several of the steps of the prior art method of harvesting seed and fostering growth of a mature perennial grass crop;

FIG. 2 is a block diagram illustrating several of the steps of the method of the present invention for harvesting seed and fostering growth of a mature perennial grass crop;

FIG. 3 is a schematic view of a field of a mature perennial grass crop, showing the field prior to a swathing stage of the method of the present invention, including an enlarged detail inset to show individual grass plants;

FIG. 4 is a schematic view of a field of a mature perennial grass crop, showing the field after the swathing stage of the method of the present invention, including an enlarged detail inset to show individual cut stalks;

FIG. 7 is a top view of a schematically illustrated fertilizer application unit applying fertilizer in a preferred pattern according to the present invention.

DETAILED DESCRIPTION OF THE PREFERRED EMBODIMENTS

Figure 5:
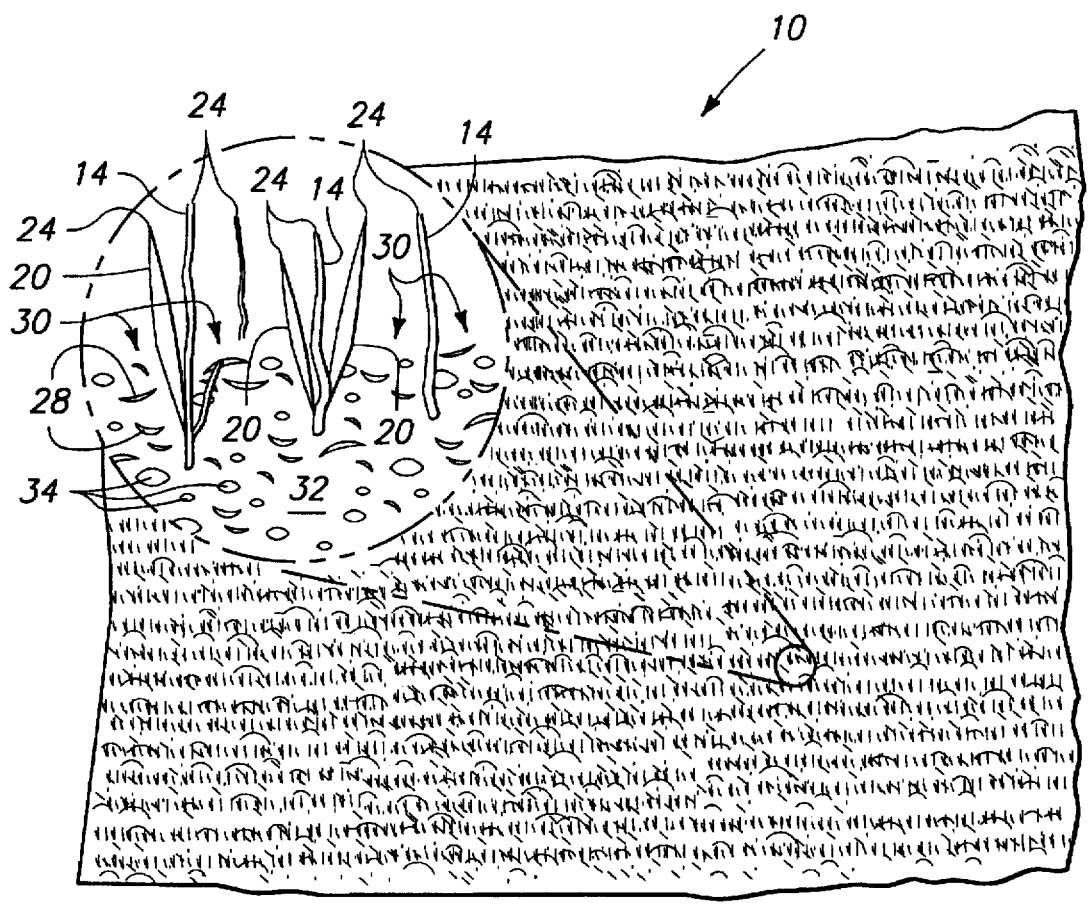
FIG. 5 is a schematic view of a field of a mature perennial grass crop, showing the field after the harvesting stage of the method of the present invention, including an enlarged detail inset to show individual cut stalks and deposited reflective canopy.

This disclosure of the invention is submitted in furtherance of the constitutional purposes of the U.S. Patent Laws "to promote the progress of science and useful arts" (Article 1, Section 8).

The present invention may be referred to as A Biological Oxidation Regeneration Enhancement Seed System (ABORESS) or a Mulch Oxidation Seed System (MOSS) or as an "ABORESS-MOSS" system for fostering growth of a mature perennial grass crop in a field while eliminating the burn process used by most conventional grass farming practices. The process of the present invention is exemplified in FIGS. 2–4.

Referring to FIG. 2, the ABORESS-MOSS system in a preferred form includes several steps common to conventional processes of grass seed farming. For instance, like conventional processes of grass seed farming, the process of the present invention includes the steps of swathing the stand of grass plants and harvesting seed from the seed-containing heads of the swathed plants.

A significant difference between the process of the present invention and most conventional processes of grass seed production is that in the presently preferred process, a no burn step is included subsequent to harvest of the grass seed. It should be noted also that the present process may be used for one or a succession of the many seasons that a perennial field of grass can undergo. It is contemplated therefore that the process may be incorporated with conventional methods of grass seed farming to reduce, but not necessarily eliminate the step of field burning. For instance, a farmer may use the process of the present invention every other season and burn during the intervening seasons. Thus, the present process does not preclude burn steps prior to, or subsequent to, a season of grass seed production.

Among the anticipated reasons why farmers may wish to continue to burn during some seasons while using the present process during others are: (1) an occasional burn is useful for pest control; and (2) under certain climate conditions the grass may respond better to a burn. In any event, by reducing the amount of field burning using the present invention, environmental and economic costs of long-term grass seed production will likewise be reduced.

Another difference between the present process and conventional grass seed production processes is in the timing of fertilizer application. Fertilizer is generally applied much earlier in the process of the present invention than in conventional grass farming practices. In conventional methods of grass seed farming, the fertilizer is generally applied after a burn. Since the burn is not accomplished until the field reaches dry dormancy, the fertilizer is applied well after the harvest of grass seed. The reason for applying fertilizer after the burn is to prevent the burn from destroying some, or all, of the nutrient value of the fertilizer.

Since the process of the present invention does not include a burn step, there is no need to wait for application of fertilizer. Thus, fertilizer can be applied immediately after, or even during the step of harvesting the grass seed. Accordingly, the grass plants get a boost of nutrition much quicker with the present process than with conventional methods of grass farming. This early boost of nutrition aids the grass plants in maturing quickly and thereby aids in achieving vernalization during the winter months. The application of fertilizer in the process of the present invention is discussed in more detail below.

Yet another difference between the process of the present invention and the conventional process of grass seed production relates to dormancy of the grass plants. In the process of the present invention, the grass plants do not go dormant. In contrast, in the methods of conventional grass seed production the plants generally do go dormant, and are snapped out of dormancy with a burn.

In the process of the present invention, the plants are prevented from going dormant by providing them with light and fertilizer promptly after the time the grass seed is harvested. It is also advantageous to apply a mulch, or canopy at the base of the plants which aids in keeping the soil cool and in keeping moisture within the soil. Further, the grass plants may be irrigated if it appears that the grass fields are too dry to support rapid growth of the grass plants.

The amount of fertilizer and water provided in the method of the present invention is similar to the amount of fertilizer and water provided in a conventional grass seed producing process, only the timing is different. Thus, persons skilled in the art of grass seed production can readily determine how much water and fertilizer to provide.

The appropriately timed combination of light, fertilizer and water provided by the present invention stimulates growth of the grass plants and prevents them from entering dormancy. By keeping the grass plants out of dormancy, practitioners of the present process can bring the grass plants to a stage of maturity that vernalizes in the winter months without burning the grass plants.

Several of the steps of the present invention are illustrated in detail in FIGS. 3–7. Referring to FIG. 3, a field 10 of a mature perennial grass crop is provided. This step is accomplished using conventional farming techniques. In one example, the mature perennial grass crop is Kentucky Bluegrass. The mature grass crop includes plants 12 with plant stalks 14, upper stems 16 and seed-containing heads 18. The plants also include leaves 20.

In the next step, as shown in FIG. 4, upper stems 16 and seed-containing heads 18 are separated from associated plant stalks 14 by swathing. Swathing leaves windrows 22 comprised of upper stems 16 and seed-containing heads 18. Preferably, the swather is set to leave a stubble of standing plant stalks 14 of a length between approximately 2 and approximately 7 inches. Most preferably the stalk lengths are between approximately 4 and approximately 6 inches from the ground surface to the cut ends of the stalks 14. Stalks or stubble 14 and leaves 20 comprise the standing remnant of the grass crop in field 10. The standing remnant has a top surface 24 which comprises the topmost surfaces of stalks 14 and leaves 20 and which is elevated above the ground.

Figure 5A:
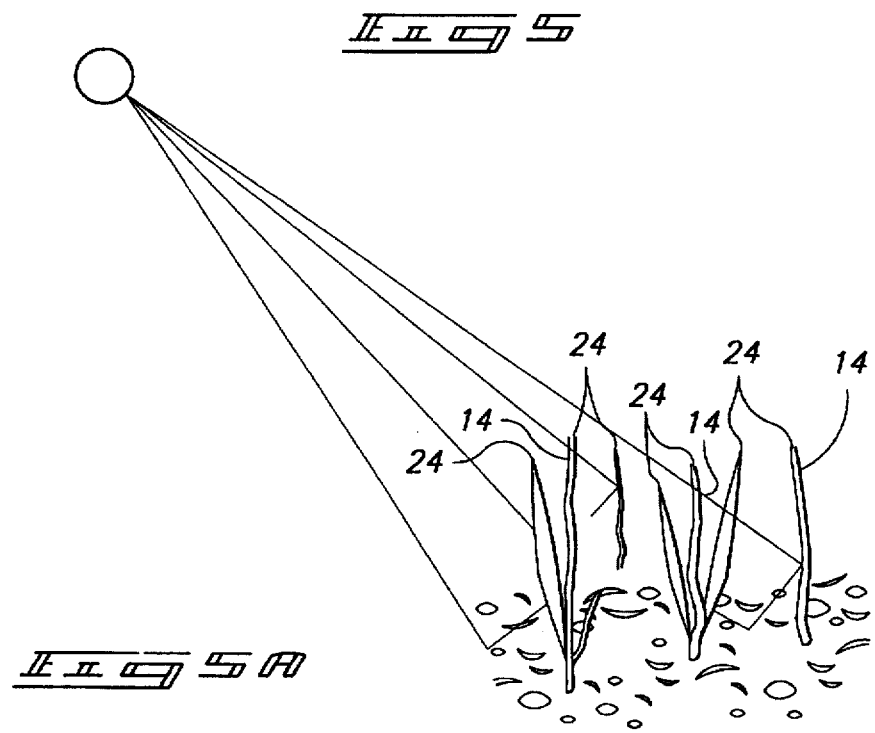
FIG. 5a is a diagrammatic view illustrating light reflectivity from standing remnant and light reflective material following harvest.

It has been found that stalks cut to the preferred height function will reflect sunlight beneficially toward one another (FIG. 5a). Stalks that are cut too high will shade one another and minimize the benefits gained from the sun. Proper stalk height is of even greater importance in older fields where the grass plants have spread and have become more dense.

Figure 6:
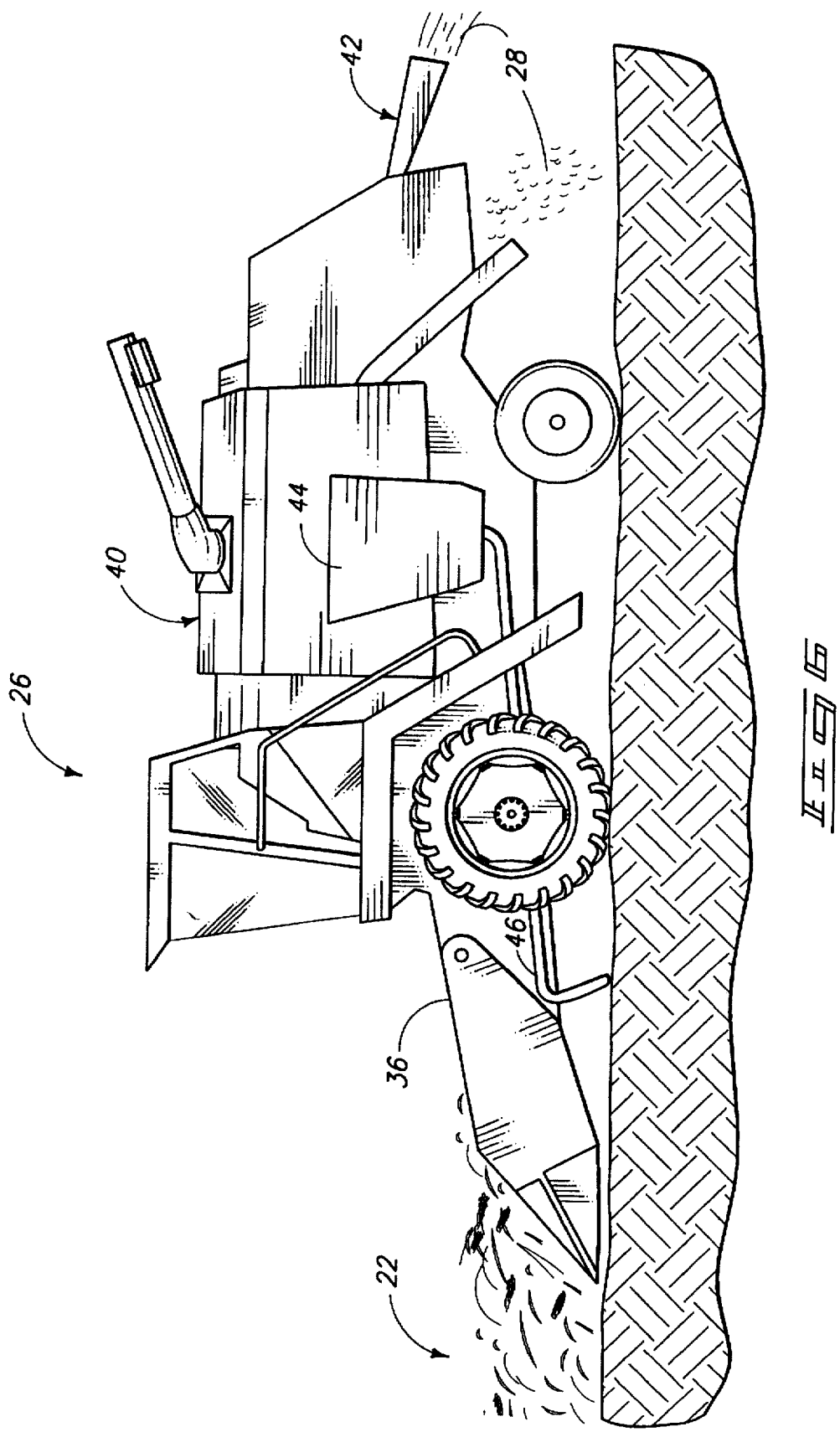
FIG. 6 is a side elevation view of a mobile thrashing and separating implement for use in carrying out the process of the present invention.

Referring to FIGS. 5 and 6, windrows 22 are lifted into a mobile thrashing and separating implement 26, such as a combine. Thrashing and separating implement 26 substantially separates grass seed from a residue 28 comprising chaff, upper stems, leaves, and other grass plant parts. Preferably, implement 26 expels residue 28 such that residue 28 is deposited as a substantially uniform layer over field 10 (FIG. 5). Also preferably, implement 26 reduces residue 28 to a maximum approximate size capable of passing through a 4 inch mesh screen and most preferably reduces it to a size capable of passing, in any orientation, through a 0.25" mesh screen.

One method of producing such a finely ground residue is to place an extra chopper, or choppers, into an existing combine. When extra choppers are installed, existing cooling capacity and horsepower may not be adequate, so extra cooling capacity and a greater horsepower engine may also need to be installed.

The finely ground residue readily filters through plant stalks 14 and leaves 20 to form a residue canopy 30 between a surface 32 of the ground and the height above ground surface 32 at which the grass was swathed. Most preferably, residue canopy 30 will be between the surface of the ground 32 and top surface 24 of the standing remnant. The canopy 30, as shown in FIG. 5a, presents a light reflective surface, reflecting sunlight upwardly to the under sides of leaves in the standing remnant. Light and heat reflected away from soil by the chaff canopy is absorbed by the standing remnant and used to resist dormancy.

Another, less preferred, method of enabling chaff to fall between the plant stalks 14 is to leave the chaff coarser and to space the plant stalks further apart. The rows may be spaced further apart by several methods known to practitioners skilled in the art of grass seed production, including mechanical or chemical removal of existing grass plants and wider seed spacing during planting.

Residue canopy 30 fosters the growth of the grass plants by providing an insulating layer over the soil to keep the soil cool and trap moisture within the soil. Residue canopy 30, together with stubble 14 and leaves 20, further fosters the growth of the perennial grass crop by reflecting light onto the surfaces of leaves 20.

In the absence of a residue canopy 30, the surface beneath leaves 20 would generally be the relatively dark surface 32 of the ground. Accordingly, a relatively large fraction of the sunlight reaching the surface would otherwise be absorbed rather than reflected back toward leaves 20.

However, a residue canopy 30 placed over ground surface 32 will produce a light reflective surface beneath the leaves 20. Such a light reflective surface reflects a considerably larger fraction of sunlight back toward leaves 20. Such reflection of sunlight back toward the leaves serves two purposes. First, the reflection helps to warm the leaves and thereby stimulates active growth of the grass plants. Second, such reflection increases the amount of photosynthesis in the leaves by providing light to otherwise shaded portions of the leaves. The advantage of having a light surface beneath leaves 20 can be especially pronounced in the Northern hemisphere from late summer to early spring, when the amount of available sunlight is decreased due to shorter days and the steeper angle of the sun relative to the hemisphere.

Other forms of light reflecting material besides residue 28 may be used to reflect sunlight in the present process. Preferably, any such light reflecting material used in the process of the present invention will be deposited as a substantially uniform layer beneath the top surface 24 of the standing remnant. The substantially uniform layer of light reflecting material will preferably be placed throughout field 10 at least within about three months of removing seed from seed-containing heads 18, and most preferably will be placed in the field during harvest or within a couple of days of the harvest of grass seed. This assures that the benefits of the light reflecting layer will be provided to the grass plants well before winter, in order to enhance sufficient growth to support vernalization.

The stubble 14 and lower leaves 20 remaining in field 10 are expected to aid in reflecting light back onto the growing parts of the swathed grass plants. The light reflecting properties of stubble 14 and leaves 20 can be enhanced by swathing at the desired height to leave appropriately sized leaves and stalks remaining in field 10.

Referring to FIG. 5, a preferred step in the present method includes application of a layer of fertilizer 34 between plant stalks 14, and most preferably beneath canopy 30. Fertilizer 34 preferably contains nitrogen. The fertilizer shown is a pellet form, such as is commonly marketed as ammonium nitrate, ammonium sulfate, ammonium phosphate, or pelleted urea. However, other forms of nitrogen content fertilizers, such as liquid urea and anhydrous ammonia may also be utilized in the present process.

Fertilizer 34 may be applied either before or after canopy 30 is deposited onto the field. If fertilizer 34 is applied after canopy 30 is deposited on the field, then steps may be taken to assure that the bulk of the fertilizer 34 will filter down below canopy 30 and within the ground so that fertilizer 34 may be utilized by the grass plants. If fertilizer 34 is applied as a solid pellet, then fertilizer 34 may simply be applied to the top of canopy 30 and allowed to trickle through the canopy to surface 32. Subsequently, as water is applied to the field, either through rain or irrigation, fertilizer 34 will end up within the ground and accessible to the growing plants. If fertilizer 34 is applied as a liquid, such as liquid urea, or as a gas, such as anhydrous ammonia, then one or more nozzles may be used to assure that the fertilizer is injected beneath canopy 30 and directly onto or into the ground.

It is contemplated that the fertilizer will work in conjunction with canopy 30 to stimulate growth of grass plants in field 10. Accordingly, fertilizer 34 will preferably be applied to field 10 at least within about three months of depositing canopy 30 over the field, and more preferably within about one month of depositing canopy 30 over the field. Most preferably fertilizer is applied just before, or within about two weeks after depositing canopy 30 over the field.

The combination of fertilizer 34 and canopy 30 will stimulate rapid growth of the grass plants in field 10. Also, the combination of fertilizer 34 and canopy 30 will assist in composting the canopy 30 and foster the health of the grass plants in field 10, such that the grass plants will remain resistent to diseases and pests that may otherwise affect the grass plants. It is believed that as long as adequate nutrition and light reaches the grass plants, the plants will be less susceptible to diseases or pests and it will be unnecessary to sterilize field 10 with a burn. The additional light reflected within the stubble by the remnant leaves and by light reflecting from the canopy is believed to aid in making strong and healthy plants which can utilize fertilizer to produce reasonable yields of grass seed without field-burning.

To fully appreciate this invention, it is necessary to recognize that not all pests are bad. One of the justifications for field burning is that it controls the population of field mice in the field. However, in a properly cared for field, with proper nutrition, even the field mouse can be an asset. The field mouse can aid in aerating the field by digging tunnels, and can aid in supplying nutrient in the field through its waste products. The mouse is, in effect, a natural cultivator. However, if mice proliferate and overrun the seed field, control may become needed. Such control may be provided in the form of appropriate pesticides, or by occasional rather than annual burns.

The present invention significantly reduces or eliminates the amount of field burning necessary to produce a healthy crop of grass seed. Also, it is noted that other possible methods may be found for controlling diseases and pests. For instance, a possible method for controlling field mice may be to disrupt the mouse's habitat with a spaced or striped rotorator. This will, in addition to displacing the mouse, also in effect do the mouse's job of aerating the soil.

Referring to FIG. 6, a mobile thrashing and separating implement 26 is shown, modified to apply fertilizer in the process of the present invention is illustrated. The shown implement 26 is a modified conventional combine. Like the conventional implements, implement 26 has a header or uptake unit 36 configured for lifting and receiving a windrow 22. Implement 26 also contains conventional thrashing and separating components (not shown) within the interior of the implement which separate seed-containing heads into seed and residue 28. Also, like the conventional implements, implement 26 includes a grain hopper 40 for storing seed and a disposal unit 42 for spreading residue 28 evenly behind implement 26. Preferably, the thrashing and separating components of implement 26 are modified such that the dispersed residue 28 is especially fine and will pass through at least a 4 inch mesh opening size screen; most preferably the chaff will pass, in any orientation, through a 0.25 inch mesh opening size screen.

Unlike conventional thrashing and separating implements, implement 26 further includes a fertilizer storage assembly 44. Preferably, two storage assemblies 44 are provided, one on each side of the implement 16 to avoid imbalance over the ground engaging wheels. Implement 26 also includes one or more fertilizer output tubes 46 connected with fertilizer storage assembly 44. Fertilizer storage assembly 44 and output tubes 46 are configured to travel with mobile thrashing and separating implement 26 over grass field 10. In the process of the present invention, fertilizer will be stored in fertilizer assembly 44 and applied to grass field 10 through fertilizer output tubes 46 as grass seed is harvested with mobile thrashing and separating implement 26.

In the embodiment shown in FIG. 6, fertilizer output tubes 46 travel ahead of chaff disposal unit 42. Accordingly, fertilizer 34 is applied beneath residue 28. However, it is also contemplated that fertilizer output tubes 46 could travel behind chaff disposal unit 42. Such would occur, for instance, in an embodiment in which a separate fertilizer storage and distribution unit (not shown) was pulled. As discussed previously, fertilizer 34 may be placed beneath residue 28, even if the fertilizer is applied after residue 28 is spread, by either having output tubes 46 travel beneath the layer of chaff or by applying a pellet type fertilizer onto chaff layer 28 and allowing the pellets to settle through chaff layer 28 and onto the ground surface.

Preferably, fertilizer 34 will comprise a liquid urea type fertilizer and will be applied as a liquid ahead of the chaff disposal unit 42. It is noted that fertilizer storage unit 44 and output tubes 46 may travel with implement 26 without being attached to implement 26. For instance, fertilizer storage unit 44 and output tubes 46 may be attached to a separate mobile unit, independently controlled from implement 26 and yet traveling with implement 26 over grass field 10. Such would occur, for instance, if a storage unit 44 and output tubes 46 were attached to a truck, or fertilizing implement, which followed implement 26 over field 10.

Referring to FIG. 7, a preferred pattern of application 48 of fertilizer 34 beneath a mobile thrashing and separating implement 26 is shown. Such a preferred pattern will cover field 10 evenly with fertilizer 34. The fore-end of mobile thrashing and separating implement 26 is shown schematically in FIG. 7 in relation to a windrow 22. Several fertilizer output tubes 46 are also shown relative to implement 26 which is diagrammatically illustrated.

As shown in FIG. 7, there are several windrows 22 in field 10, with the center of each windrow being spaced from the centers of adjacent windrows about equally, by about a distance "X". Under the diagrammed condition, in which implement 26 is set up to harvest one windrow 22 at a time, the preferred pattern of application 48 will have a width "X". Also, the pattern will be oriented relative to field 10 such that pattern 48 extends about a distance "Y" on either side of the picked up windrow 22, wherein "Y" is about one-half of "X".

The purpose of the orientation is to ensure that field 10 is substantially evenly covered with fertilizer 34. Accordingly, the size and orientation of pattern 48 will vary depending on how many windrows are picked up by implement 26. For instance, if implement 26 picks up two windrows 22 at a time, then the preferred width of pattern 48 is doubled relative to the preferred width when only one windrow is picked up. Accordingly, the pattern 48 will have a width of two times "X" and will extend a distance "Y" beyond each of the two picked up windrows. If three windrows are picked up, the preferred width of pattern 48 is tripled, and pattern 48 has a length of three times "X" and extends a distance "Y" beyond each of the three picked up windrows.

It is expected that the total amount of fertilizer applied to a grass field in the process of the present invention will be quite similar to the total amount of fertilizer applied in the conventional grass seed growing process. This expectation has been borne out in several field trials of the process of the present invention. Accordingly, the total amount of fertilizer required for the process of the present invention will be readily apparent to persons of ordinary skill in the art of grass seed farming.

The timing of fertilizer application in the process of the present invention is, however, quite different from the conventional process of grass seed production. As discussed above, in the conventional process of grass seed production the fertilizer is applied after a burn. In colder, Northwest climates, the harvest of grass seed typically occurs in the month of July, the burn in the month of August or September, and the fertilizer is not applied until the month of October. Thus, the fertilizer is generally applied two to three months after harvest and one to two months after burning. In the process of the present invention the fertilizer is applied promptly at or near the harvest since there is no burn.

It is also anticipated that in the process of the present invention the fertilizer may be applied as one or more smaller doses after harvest rather than as one large dose. Thus, about one-fifth of the total amount of fertilizer to be applied in the fall and winter following harvest may be applied during or within a few days following the harvest. The remainder of the fertilizer to be applied may then be applied several days, weeks, or months later.

Recent experiments have been completed comparing Kentucky Bluegrass grass yields from stands grown with the present ABORESS-MOSS system to yields from Kentucky Bluegrass stands grown by a traditional burn method. The yields for the stands grown with the ABORESS-MOSS system were generally comparable to, and sometimes better than, the yields from stands grown with the traditional burn method. Thus, the ABORESS-MOSS process of the present invention is a commercially viable alternative to the traditional burn methods of grass seed production.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A no-burn process for fostering growth of a mature perennial grass crop in a field, comprising the steps of:
   providing a mature perennial grass crop in a field, the mature grass crop including plants with plant stalks, upper stems and seed-containing heads;
   separating upper stems and seed-containing heads from the associated plant stalks by swathing the grass crop at a height above the ground surface to leave plant stalks of a length of between approximately 2 and approximately 7 inches;
   leaving the plant stalks unburned;
   thrashing the upper stems and seed-containing heads in the thrashing and separating implement to separate seeds and to form a residue comprising upper stems and non-seed-containing head parts;
   reducing the residue in the thrashing and separating implement to an approximate size capable of passing through a 4 inch mesh screen;
   after reducing the residue, depositing the residue from the thrashing and separating implement over the unburned plant stalks;
   filtering the residue through the unburned plant stalks to form a residue canopy between the surface of the ground and the height above the ground surface at which the grass crop was swathed; and
   applying nitrogen-containing fertilizer between the unburned plant stalks.

2. The process of claim 1 wherein the step of applying the fertilizer occurs within about one month of the step of depositing the residue between the plant stalks.

3. The process of claim 1 wherein the step of applying the fertilizer occurs within about two weeks of the step of depositing the residue between the plant stalks.

4. The process of claim 1 wherein the step of applying the fertilizer occurs before the step of depositing the residue between the plant stalks.

5. The process of claim 1 wherein the step of separating upper stems and seed-containing heads from plant stalks comprises swathing the grass crop at a height above the ground surface to leave plant stalks of a length of between approximately 4 inches and approximately 6 inches.

6. The process of claim 1 wherein the step of providing a mature perennial grass crop comprises providing a mature Kentucky bluegrass crop.

7. A no-burn process for fostering growth of a mature perennial grass crop in a field, comprising the steps of:
   providing seed-containing heads on the grass crop;
   operating a thrashing and separating implement to remove seed from the seed-containing heads and form a residue from the remaining grass crop, leaving a standing remnant of the grass crop in the field, the standing remnant having a top surface which is elevated above the ground;
   leaving the standing remnant unburned;
   applying a layer of nitrogen containing fertilizer beneath the top surface of the unburned standing remnant; and
   producing a light reflective surface between the top surface of the standing remnant and ground by depositing a substantially uniform layer of said residue over the field beneath the top surface of the standing remnant.

8. The process of claim 7 wherein the step of providing seed-containing heads on the grass crop comprises providing seed-containing heads on a Kentucky bluegrass crop.

* * * * *